United States Patent
Boyadjieff

(10) Patent No.: US 7,911,173 B2
(45) Date of Patent: Mar. 22, 2011

(54) OPEN LOOP METHOD FOR CONTROLLING POWER

(75) Inventor: George I. Boyadjieff, Villa Park, CA (US)

(73) Assignee: Power Efficiency Corporation, Ann Arbor, MI (US)

( * ) Notice: Subject to any disclaimer, the term of this patent is extended or adjusted under 35 U.S.C. 154(b) by 300 days.

(21) Appl. No.: 12/073,760

(22) Filed: Mar. 10, 2008

(65) Prior Publication Data
US 2008/0224646 A1    Sep. 18, 2008

Related U.S. Application Data

(60) Provisional application No. 60/894,751, filed on Mar. 14, 2007, provisional application No. 60/894,765, filed on Mar. 14, 2007, provisional application No. 60/982,087, filed on Oct. 23, 2007.

(51) Int. Cl.
*G05B 6/02*       (2006.01)

(52) U.S. Cl. .................... 318/621; 318/729; 318/805

(58) Field of Classification Search .................. 318/621, 318/729, 805, 812, 739, 779, 798, 806, 811, 318/437, 776, 622, 775; 320/17; 323/237
See application file for complete search history.

(56) References Cited

U.S. PATENT DOCUMENTS

| | | | |
|---|---|---|---|
| 4,266,177 A | 5/1981 | Nola | |
| 4,459,528 A | 7/1984 | Nola | |
| 5,008,608 A | 4/1991 | Unsworth et al. | |
| 5,077,512 A * | 12/1991 | Weber | 318/776 |
| 5,410,240 A | 4/1995 | Runggaldier et al. | |
| 5,821,726 A | 10/1998 | Anderson | |
| 2006/0132103 A1 | 6/2006 | Baratto et al. | |

OTHER PUBLICATIONS

Uicich, G., Ullrich, H., Project, May 8, 2000, "Modification of the Thyristor Gate Control System of the PS Main Magnet Power Supply", European Organization for Nuclear Research (CERN ? PS Division), Geneva, Switzerland.

* cited by examiner

*Primary Examiner* — Karen Masih
(74) *Attorney, Agent, or Firm* — Birch, Stewart, Kolasch & Birch, LLP

(57) ABSTRACT

A method of power control for an electrical motor using open-loop principles is disclosed. The method employs a desired control line function that determines hold-off time based on a detected phase lag of a motor drive signal. The motor to be controlled is driven with a motor drive signal at a given load for a first number of cycles to detect the phase lag of the motor drive signal. Controlling for phase lag for a second number of cycles is then accomplished by firing a thyristor according to the phase lag of the motor drive signal. Advantages include reduced power consumption of a motor controlled by an embodiment of the method or controller, and faster response time between the detection of load changes on the motor and the issuance of power control signals.

35 Claims, 15 Drawing Sheets

OPEN LOOP METHOD FOR CONTROLLING POWER

PRIORITY

This Nonprovisional application claims priority under 35 U.S.C. §119(e) on U.S. Provisional Application Nos. 60/894,751 filed on Mar. 14, 2007, 60/894,765 filed on Mar. 14, 2007 and 60/982,087 filed on Oct. 23, 2007, the entire contents of which are hereby incorporated by reference.

TECHNICAL FIELD

The present invention relates generally to controlling electrical appliances and equipment, and is more particularly related to methods, systems, and apparatus for controlling an electric motor for the conservation of energy.

BACKGROUND

Power factor measures the ratio of average power to the apparent power in an electrical load. Power factor ranges from a value of 0 (where the impedance of the load is purely reactive) to 1 (for a purely resistive load). In practice, the power factor of electrical devices ranges somewhere between 0 and 1, and the closer this value is to unity, the more efficiently energy is consumed by the device and the less power is wasted. Therefore, for consumers of electricity that employ highly reactive loads (e.g. electrical induction motors), it is crucial that steps be taken to adjust the power factor of their apparent load to improve performance and avoid wasting enormous amounts of power. For example, a mill that consumes 100 kW from a 220-V line with a power factor of 0.85 will require 118 kW of apparent power supplied, but if the power factor is improved to 0.95, the apparent power supplied drops to 105.3 kW. Many utility companies require such consumers to take affirmative steps to adjust power factor.

Large factories are not the only environments to benefit from improvement in power factor. AC motors are present in many different electrical appliances and equipment from compressors to elevators, and since they are usually inductive in their input impedance, they often present a less than desirable power factor rating, especially under light load conditions or during certain periods of load variance. To improve the power factor in AC motors, controllers have been developed and are generally known in the art. Examples, as discussed in more detail below, may be found in U.S. Pat. No. 4,459,528 (Nola), U.S. Pat. No. 4,266,177 (Nola), and U.S. Pat. No. 5,821,726 (Anderson), the disclosures of which are fully incorporated by reference herein for all purposes.

In general, the power factor mitigation approach taken by many AC motor controllers is accomplished by sensing the phase difference between the current and voltage phasors and then using a controller to adjust the actuation of thyristors in each AC motor phase to attempt to reduce the voltage and current phase lag. In an ideal implementation, if the phase between the current and voltage phasors can be brought to zero, the load looks resistive to the power supply, and therefore, the power factor would approach unity. While unity power factor is not entirely practically achievable, small improvements in power factor can make substantial differences in power consumption.

Many different approaches to improving power factor in electrical motors have been developed over the years. Power reduction systems for less than fully loaded induction motors wherein the phase angle between current and voltage (motor power factor) is controlled are already known in the art. In such systems, the motor power factor is controlled as a function of the difference between a commanded power factor signal and the operating power factor, through control of thyristors (e.g. a triac) connected to the motor. A controller developed by Frank Nola in 1977 is exemplary of this type of power reduction system.

In the Nola controller a phase lag signal is obtained by the circuitry. The phase lag signal is compared with a command phase lag signal representing a desired minimum power factor of operation. The resulting difference signal, a circuit error signal, is then used to control the on and off time of a triac in series with the winding of the induction motor to maintain motor operation at the selected power factor. This has the effect of reducing the power input to a less than fully loaded motor.

The principle of the Nola controller is to reduce the average voltage supplied to the motor when the motor is not operating at full rated load, by switching off the voltage for a portion of each half wave cycle. A typical induction motor operates most efficiently at rated load. For loads below rated load, the efficiency drops off. The effect of reducing the voltage causes the motor to be a smaller horsepower motor at smaller loads which in turn causes the motor to operate closer to peak efficiency.

To accomplish the lowering of voltage, it is necessary to know the load at any given moment. The one variable that is easy to measure and relates to the load on the motor is phase lag of the current to the voltage. Hence the Nola controller is in reality a phase lag controller. Phase is measured and compared to a desired phase in a classical closed loop feedback system. Inherent in closed loop control is the necessity for the control to be stable along with other dynamic requirements. This can only be accomplished with negative feedback.

The Nola Design is a closed loop control scheme. In closed loop control, system stability is determined by the dynamic characteristics of the device being controlled. In Nola's case, the motor's electrical responses to changes in voltage determine the stability of the closed loop system. It is necessary to compensate the controller output with a lag to maintain stability. In addition the closed loop gain of the system must be set with sufficient gain margin to maintain stability. These factors result in two limitations.

The first limitation is the necessary controller lag or compensation, which reduces the response of the system. This has been addressed in the Nola-type controller by the addition of circuitry for canceling this time lag during periods where the motors load suddenly increases and for providing improved response speed to a change from lightly loaded to full load conditions in order to prevent motor stalling or vibration, especially when the minimum power factor command setting is relatively high.

The second limitation of a closed loop control system of this type is not readily apparent to users of the controller. Two things have to be satisfied for stable closed loop control. First the feedback signal must be negative and second the gain must be below the point that the system goes unstable. The relationship of phase lag, the feedback signal to the motors load and voltage is fixed by the motor's electrical design. A closed-loop controller requires a certain control relationship between input and output to satisfy these stability conditions. As a result the motors energy saving is limited to considerably less than is theoretically possible. In addition, in order to set the controller to maximum energy savings, the set point has to be lowered in the field until the motor can no longer operate at the actual loads. This has the effect of putting the motor on the ragged edge of operation.

A typical motor would operate with the following conditions: If the controller is set to give full voltage at rated horsepower, the voltage and consequential power saving at no load will be on the order of 10%. However, in certain cases, up to 30% of the power could be saved. The controller accomplishes this by lowering the full load input voltage a fixed amount which results in the no load voltage being reduced further together with a reduced input voltage at full load. This works for applications that have motors over designed for the load conditions encountered as long as the motor is never required to provide full horsepower.

It would be an advance in the art to provide a fast responding controller that has the capability to improve the control of the phase lag in induction motors and hence the amount of energy saved. It would also be an advance to provide a controller that is capable of working with a broad variety of electrical appliances that contain induction motors thereby improving power factor and start-up characteristics. It would also be desirable to provide a power factor improving controller that is programmable and may be customized to particular loads and operating conditions. It would also be an advance to obtain a controller that permits full voltage operation at full horsepower and minimum voltage operation at no load, thereby eliminating the need for field adjustment.

SUMMARY OF THE INVENTION

Given the energy saving limitations of the closed loop analog controller, the single phase digital controller has been designed to achieve maximum energy savings for all applications. The approach uses open loop control principles. Basically, for a period of time called "Y" the voltage is set at full voltage and the load is determined by measuring the phase lag time. Next the hold off time is calculated and the controller is forced to run at this calculated hold off time for a period of time defined by "Z". If the number of Z cycles is large compared to the number of Y cycles, maximum energy savings is achieved. Measurement of the dynamic response of the phase lag feedback signal indicates that the phase lag can be sensed within one voltage cycle.

Aspects of the present invention pertain to a method of power control for an electrical motor using open-loop principles. The method employs a desired control line function that determines hold-off time based on a detected phase lag of a motor drive signal. The motor to be controlled is driven with a motor drive signal having a voltage zero crossing and a current zero crossing at full voltage for a given load for a first number of cycles. During this driving, the phase lag of the motor drive signal is detected. To being power control, a thyristor is fired with a firing time determined from the hold-off time of the desired control line function based on the phase lag. Controlling for phase lag for a second number of cycles is then accomplished by firing the thyristor according to the determined firing time after detecting a current zero crossing of the motor drive signal. It has been determined that significant power savings begin to accrue in embodiments of the control method that have a number of control cycles that is at least five times greater than the number of determining cycles.

An embodiment of the desired control line function contains a line slope, S, calculated from the expression $S=Amax/(Bnl-Bfl)$, where $Bnl$ is the phase lag of the motor at full voltage and no load, $Bfl$ is the phase lag of the motor at full voltage and rated load, and $Amax$ is the hold-off time for maximum phase reduction at no load; and an offset, $Of$, calculated from the expression $Of=S*Blf$, wherein the hold-off time, $A$, is calculated from the expression $A=S*B-Of$, where B is the detected phase lag.

Other aspects of the present invention are directed at a fast response variant that involves detecting a phase lag of the motor drive signal during said controlling, storing that detected phase, and comparing it to a the current phase lag being used for thyristor firing time. If the comparison shows that the stored phase lag is less than the current phase lag, a new thyristor firing time must be determined.

Yet other aspects of the present invention pertain to a computer-readable medium having a computer program embodied on it that, when executed, causes a computer or computing device to execute the above-listed steps. Further aspects of the present invention pertain to an apparatus for power control for an electrical motor, where the apparatus comprises a configurable timing unit, a zero cross detection unit, a firing time calculator, a memory unit, a thyristor, and a processor.

Yet further aspects of the present invention are directed at an appliance-optimized variant of the control method for environments where the motors typically operate below rated load and where load does not vary significantly over time, enabling the use of longer control cycles and phase-lag averaging.

Advantages of the present invention include reduced power consumption of a motor controlled by an embodiment of the inventive method or inventive controller, and faster response time between the detection of load changes on the motor and the issuance of power control signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
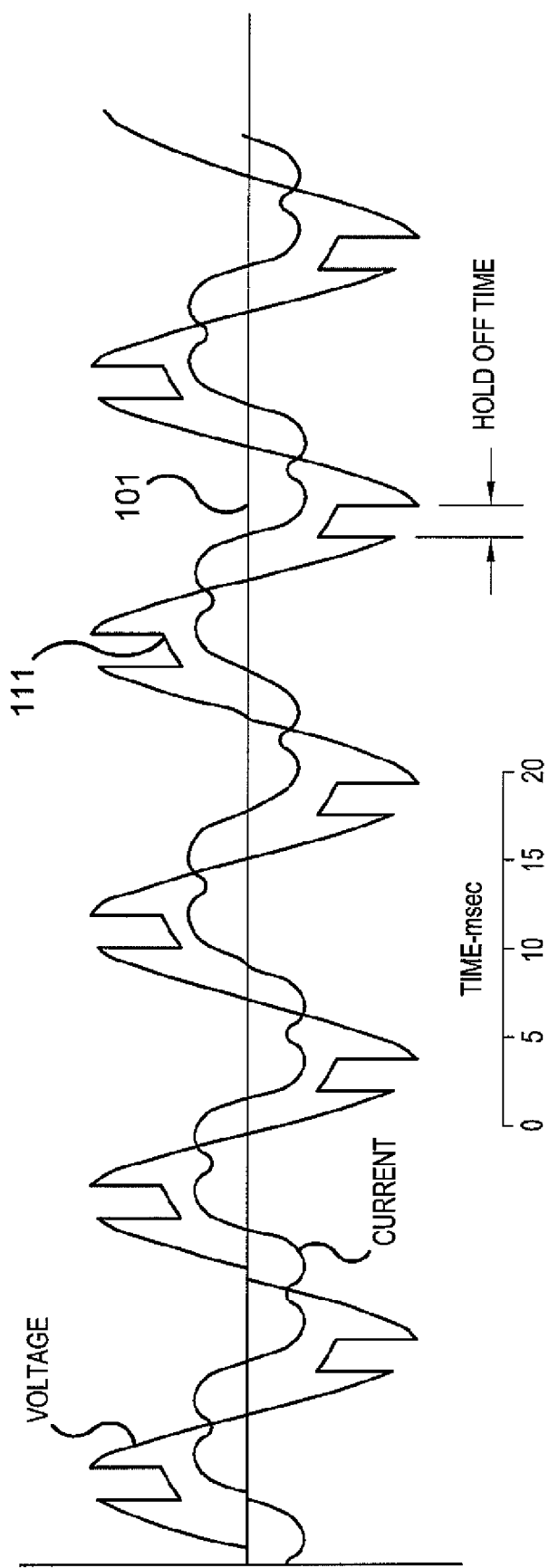
FIG. 1 is a diagram illustrating exemplary close loop control waveforms.

The Nola Design is a closed-loop phase controller that reduces the voltage on the motor when the load is reduced by turning off the alternating current for a period of time for each half of the alternating AC, sine wave. In a recent U.S. patent application Ser. No. 11/755,627, filed May 30, 2007, the disclosure of which is fully incorporated by reference herein for all purposes, an improved digital controller design based on Nola's basic methods is described. The digital controller's software uses the Nola principle of control described above. Typical waveforms are shown in FIG. 1.

Figure 2:
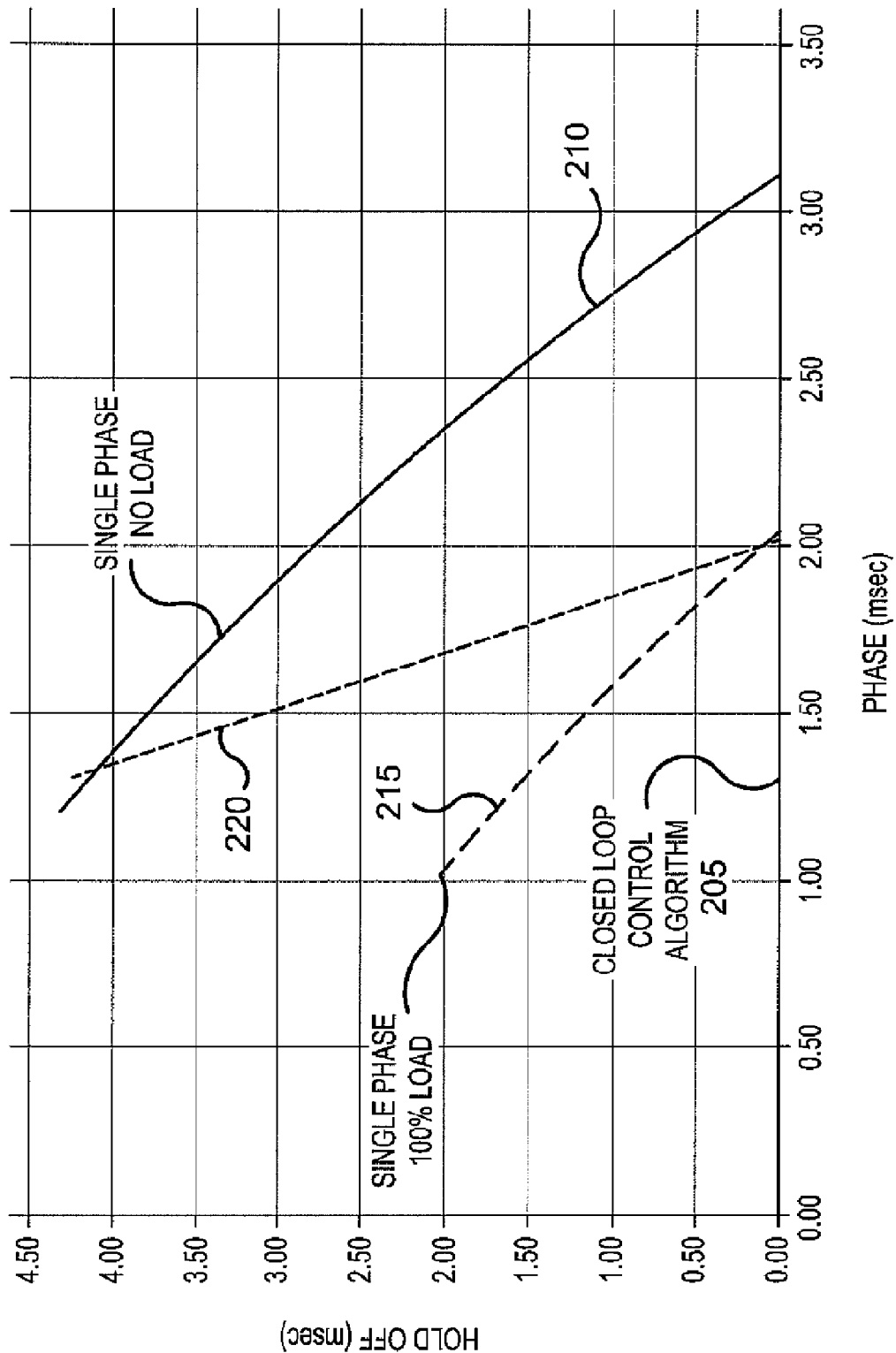
FIG. 2 illustrates hold off time versus phase lag times for both a full load condition and a no load condition of an exemplary motor.

The amount of time the voltage is turned off is called the hold off time 111. Shown in FIG. 2 are curves of hold off time vs. phase lag times for both the full load condition 215 and the no load condition 210 of the motor used as an example. Phase lag time is defined as the time between when the voltage wave crosses the zero line 101 at zero volts and the current wave form crosses the zero line 101 at zero current. The Nola controller controls phase lag by varying the hold off time along the closed loop algorithm line sloping from bottom left to top right 205. The stability requirements determine the maximum slope of this line. In order for the Nola closed loop system to remain stable the feedback needs to be negative and the gain, defined by the slope of the control line 205, cannot be much more than 4.

For the case where the Nola voltage is set at full rated voltage at full rated power 205 by shifting the control line 205 so it intersects the 100% load line 215 at zero hold-off time, the hold off time the controller controls at no load is 1.7 milliseconds based on 60 cycle voltage. The duration of the full have cycle wave is 8.3 milliseconds so the voltage is off only 20% of the time. Similarly, if the Nola controller is set to provide the maximum hold off time permissible at no load, which is about 4 milliseconds, by shifting the control line 205 until it intersects with the no-load line 210 at 4 milliseconds where the voltage is off by almost 50%, the voltage at full load will be off approximately 2.2 milliseconds or about 25% of the time. This is how some applications permit additional energy savings when the motor never has to run at rated load.

The most desirable control would be along the dotted line that slopes from bottom right to top left 220. Such a control would provide full voltage at full load by controlling the hold off time to zero and minimum voltage at no load by controlling the hold off time to the maximum allowed. This ideal type of control has been historically difficult to implement in closed loop control because the feedback signal may be positive instead of negative, potentially causing the control to become unstable.

Figure 3:
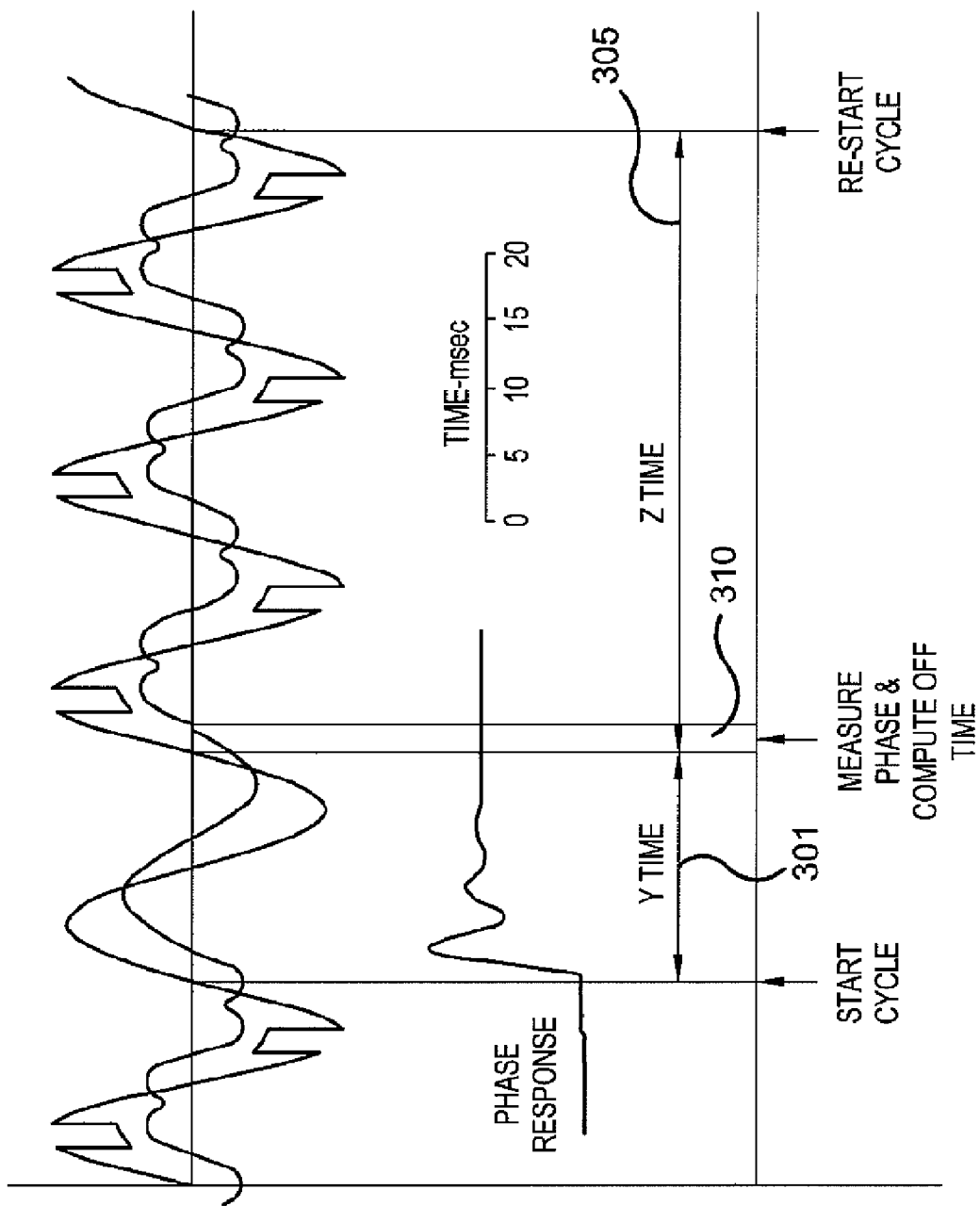
FIG. 3 depicts open loop control waveforms created by an embodiment of the present invention.

Constructing a control method that permits this type of desired control 220 is one goal of the present invention. The approach uses open loop control principles. As shown in FIG. 3, for a period of time called "Y" 301 the voltage is set at full voltage and the load is determined by measuring the phase lag time. Next the hold off time is calculated and the controller is forced to run with a fixed hold off time for a period defined by "Z" 305. The load needs to be checked often enough for any load change to be sensed. Measurement of the dynamic response of the phase lag feedback signal indicates that the phase lag can be sensed within one voltage cycle.

During the load measurement period, the voltage wave is a full sine wave. During the energy saving period, the voltage cycle is turned off for a part of the half cycle. At the end of the "Y" period 301 the phase lag 310, defined by the time between the moment the voltage crossed zero and the time the current crossed zero, is captured in the memory of the controller's digital processor. Based on this measurement, an off-time is calculated that puts the off-time along the dotted line 220 of FIG. 2. For example, in an embodiment where the motor was at no load, the zero hold-off time (full voltage) measured phase lag would be 3.2 milliseconds and the controller's processor would calculate the desired hold-off time to be 4 milliseconds. In such an embodiment, a Y period of about 20 half cycles and a Z period of about 1200 cycles is preferred. However this means that the load is only sensed every 10 seconds. This is satisfactory for embodiments used in applications that change load slowly or run at almost constant load such as refrigerators, pool pumps and dryer motors. For applications where the load changes rapidly, such as a drill press, an embodiment with an additional control loop is preferred.

Figure 4A:
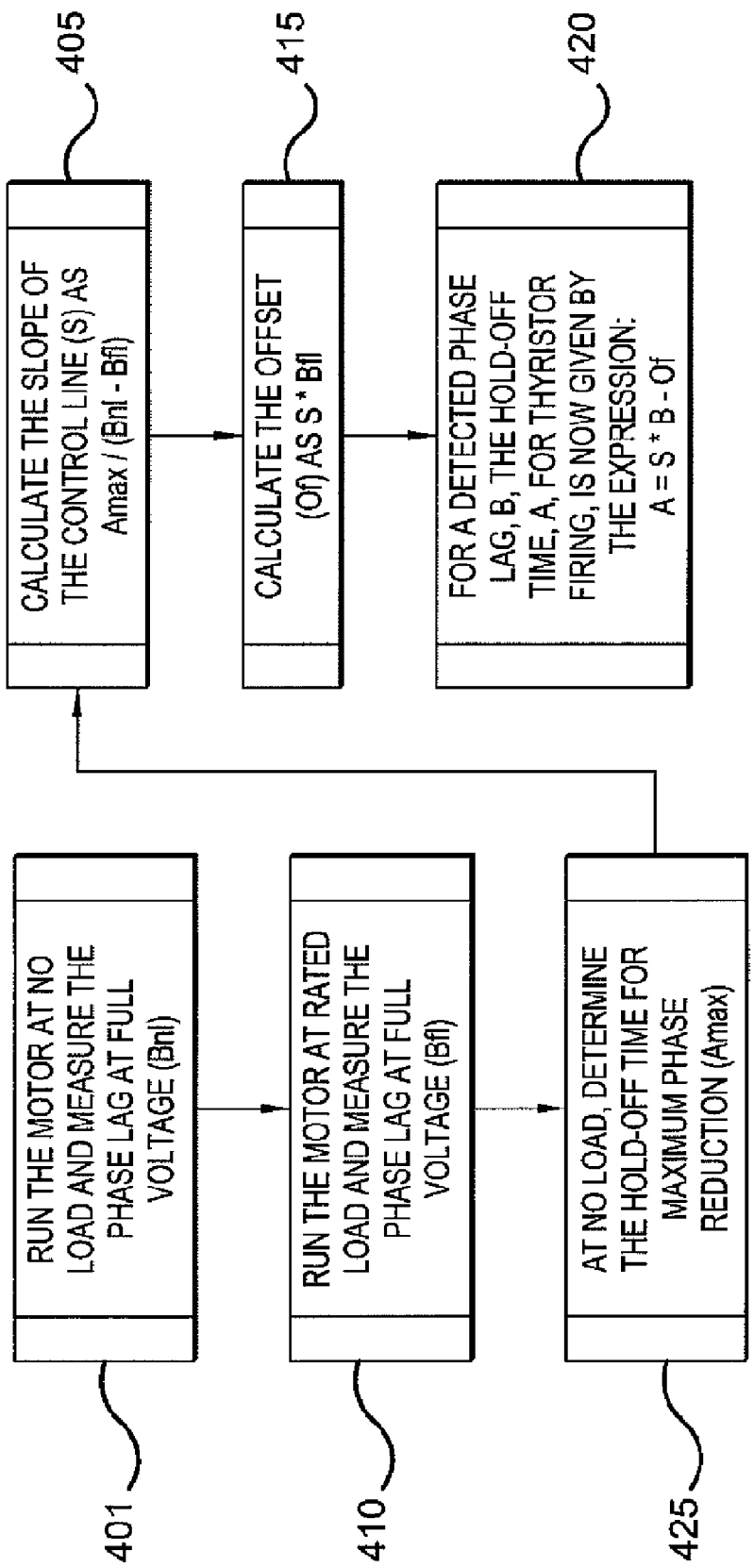
FIG. 4a is an algorithm for determining a desired control line.

During the 10 second energy saving period, the controller is measuring phase lag for each half cycle. Typically, the phase lag is being controlled between 1 to 2 milliseconds. If the load suddenly increases, the phase will rapidly drop. By programming the processor to sense this drop, it can be used to immediately terminate the Z period and revert to the Y period. The Y period will measure the new load and adjust the control to accommodate it FIG. 4a shows an embodiment of an algorithm for determining the desired control line 220 of FIG. 2. In an embodiment of a controller according to the present invention, the desired control line may be dynamically determined by the controller after it is connected to a motor. This embodiment of the determination algorithm begins with measurements of no-load phase lag a full voltage 401 and rated load phase lag at full voltage 410. These correspond to the bottom of the no load line 210 and the bottom of the 100% load line 215, respectively. At no-load, a hold-off time for maximum phase reduction 425 is also determined. From these three elements, the slope of the desired control line 405 can then be calculated. Once the slope is known, an offset can be calculated 415 based on the slope and the rated-load phase lag at full voltage. The offset, which represents an axis intercept, completes the definition of the desired control line 220. This information can then be used to calculate a hold-off time based on a detected phase lag 420.

Other embodiments of this aspect of the present invention may have hardcoded or hardwired control lines that are determined and established for controllers to be attached to specific kinds of motors with known properties. Yet other embodiments may have a range of pre-programmed control lines established, with the most suitable one chosen by the controller depending on the characteristics of the motor is it controlling. Yet further embodiments may be programmed to periodically re-calculate a preferred control line regardless of changes in motor characteristics.

Figure 4B:
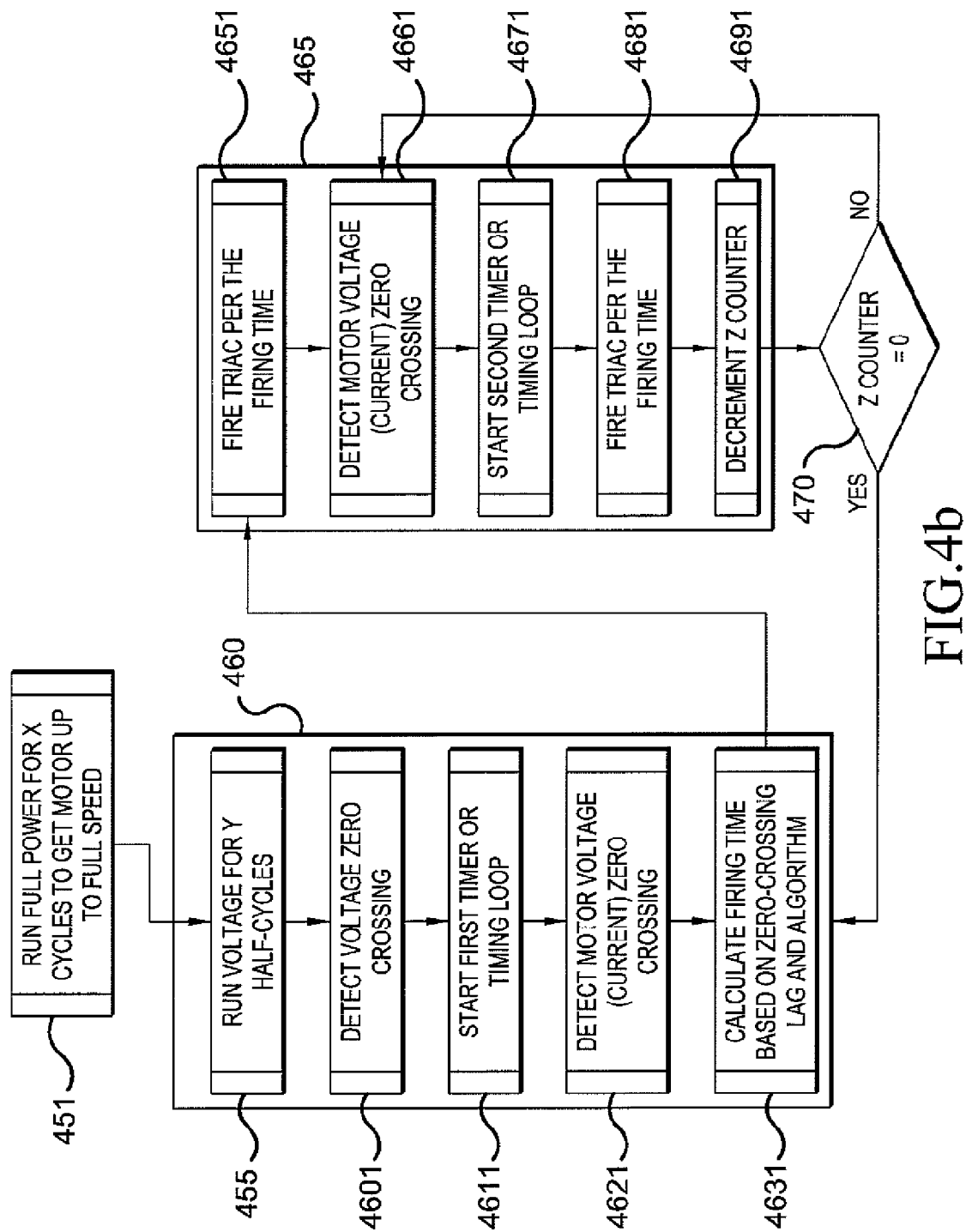
FIG. 4b is a block diagram depicting an embodiment of a method of the present invention for conserving power.

In FIG. 4b an embodiment of an algorithm for providing open loop power control is shown. Variable X determines the behavior of the controller during startup phase, and variables Y and Z determine the behavior of the controller while it is running. Preferred values for Y and Z with a 60-cycle alternating-current power input are 20 and 1200 half-cycles respectively, but various embodiments of this aspect of the present invention may employ different values for Y and Z depending on factors such as input power and desired controller response times. It has been determined that there should be no more than one Y cycle for every 5 Z cycles in embodiments of the inventive method in order to ensure substantial power savings. At ratios of less than five control cycles for every determination cycle, the system is being run at full voltage too often to deliver significant energy savings.

The variable X represents the startup time for the motor. For most small motors, the period of operation during time X 451 will put the thyristors in full conduction mode, delivering full voltage to the motor terminals. In some larger motors, a soft start implementation, with the voltage ramping up from a predetermined pedestal voltage to full voltage will be required. In either case, the function of this phase is to get the motor shaft up to full rated speed.

Once the motor is up to speed, the motor will run at full voltage for a number of half cycles, determined by the variable Y 455. After Y half cycles, the controller will calculate the optimum hold-off time for the current load condition 460. This calculation is accomplished by detecting the voltage zero crossing of the power signal 4601, initiating a timer at the voltage zero crossing 4611, detecting the current zero crossing of the power signal 4621, and then calculating a firing time for a thyristor 4631 based on the result of plugging the detected phase lag into the control line equation 420. The controller will then enter a control stage 465 where it fires a thyristor based on the calculated hold-off time for Z half cycles. This control stage is initialized by the firing of a thyristor based on the calculated firing time 4651. The controller then detects the current zero crossing 4661 and initiates a timer 4671. Because a thyristor is a bias device, it becomes inactive at the current zero crossing. This causes the observed break in the voltage signal 111 for the calculated hold-off time 420 until the thyristor is fired again at the appropriate firing time 4681. Each time the thyristor is fired in a control cycle, a counter is decremented 4691. When the counter reaches zero 470, the controller restarts the phase lag detection process. At this point, the controller will deliver full voltage to the motor, the phase lag at the current load will be detected again 460, and that data will be used for the next set of control cycles 465.

Alternate embodiments of this algorithm may include a detection of a voltage zero crossing and a timer between the voltage zero crossing and current zero crossing 4661 detections in the control stage 465. Yet further embodiments may avoid explicitly detecting a current zero crossing in the control stage 465, instead initiating a timer as soon as the thyristor is deactivated on the assumption that only a current zero crossing may deactivate the thyristor. Yet further embodiments may add or remove other steps depending on the needs of specific control applications.

Figure 4C:
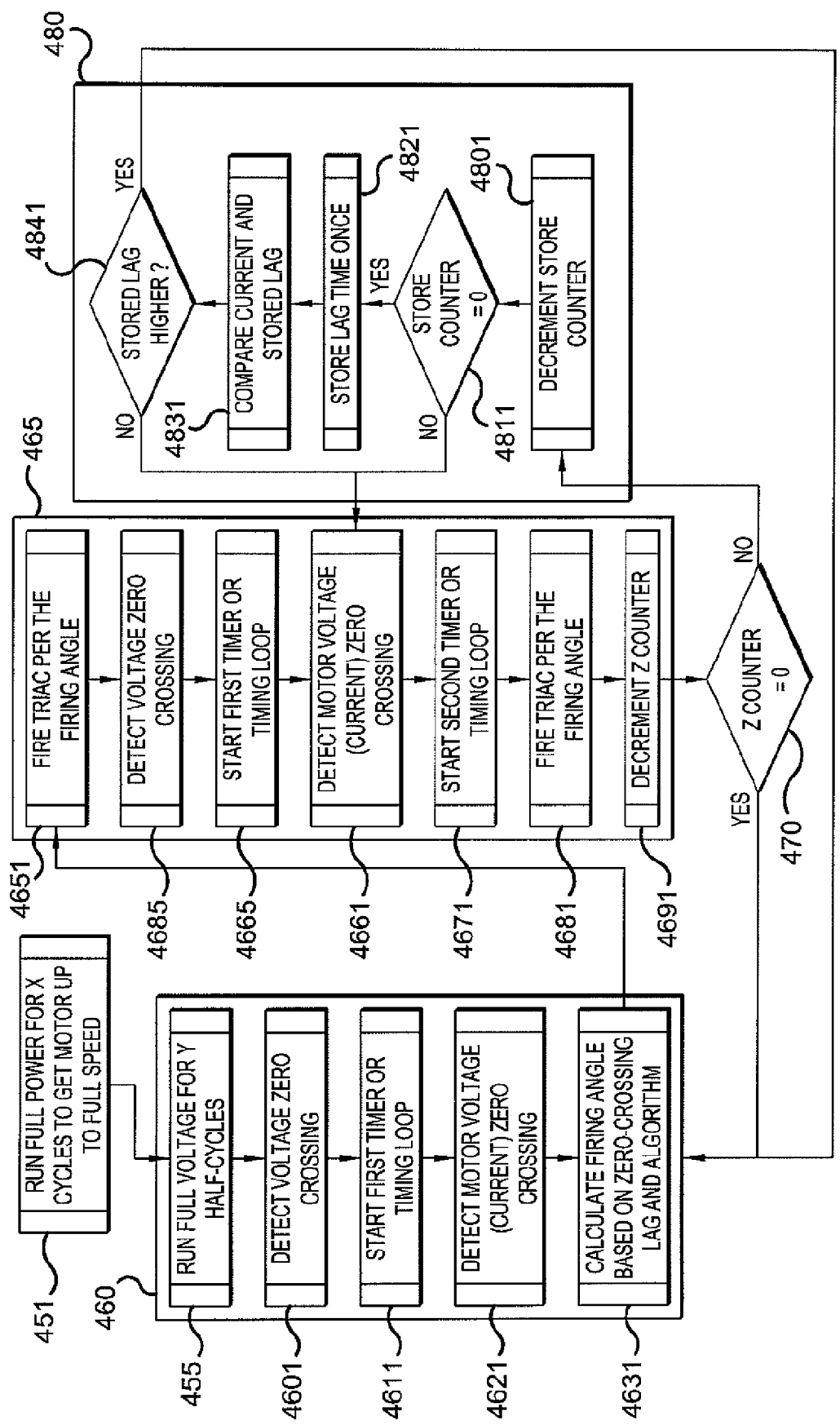
FIG. 4c is a block diagram depicting an embodiment of a method of the present invention for conserving power with a fast response component.

In FIG. 4c, an embodiment of an algorithm for providing open loop power control with fast response is shown. This embodiment of the inventive algorithm introduces the detection of a voltage crossing 4685 and the activation of a first timer 4665 in the control stage 465. The addition of these steps enables the detection of phase lag during each control cycle 465.

This embodiment of the algorithm also adds a new variable called Store Counter. This variable, preferably set to 10 half cycles, enables the addition of a fast response stage 480 that allows an embodiment of a controller according to the present invention to respond to load increases more rapidly. This is accomplished by, at the end of a non-final control cycle, decrementing the Store Counter variable 4801 and checking to see if it is at zero 4811. If the store counter is not at zero, the algorithm proceeds to the next control cycle 465. If the store counter is at zero, the algorithm stores the just measured lag time 4821 measured by the difference between the detected current and voltage crossings 4661, 4685 from the control cycle and holds it for subsequent control cycles 465. For each additional control cycle 465, the stored value is compared against the current lag time 4831 as determined in the most recent control cycle 465. If the stored lag time is higher than the current lag time 4841, preferably by 0.5 milliseconds, this indicates that the load on the motor is increasing and a new Y cycle 460 is initiated. If the stored lag time is equal to or less than the current lag, no additional action is taken and the next Z cycle 465 proceeds normally.

Alternative embodiments of this algorithm may provide a fast response solution for instances of lag increase as well as lag decrease, only for lag increase, or on a different timescale (either more or fewer Store Counter cycles). Yet further embodiments may determine the appropriate number of Store Counter cycles based on the current lag or input voltage signal detected, or from some other input to the controller.

It is anticipated that the values for X, Y, and Z will be different for various applications. Applications (such as refrigerators, washers, dryers, and other household appliances) which have relatively slow-changing loads will afford very large values for Z (on the order of seconds or even minutes) while applications with more variable loads may require smaller values for Z.

Figure 5A:
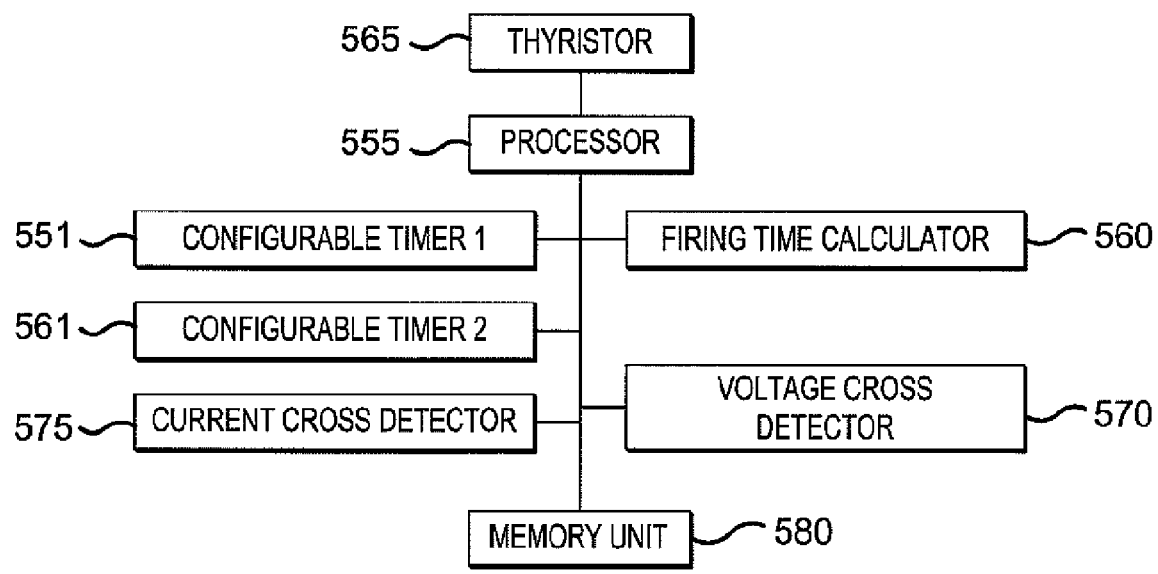
FIG. 5a is a functional diagram depicting a controller device according to the present invention.

FIG. 5a shows a functional diagram an embodiment of a controller device according to the present invention. The device shown in this embodiment comprises a thyristor 565, a processor 555, a timing unit made up of a first configurable timer 551 and a second configurable timer 561, a zero cross detection unit made up of a current cross detector 575 and a voltage cross detector 570, a firing time calculator 560, and a memory unit 580 that stores cycle counts and calculated firing times.

Figure 5B:
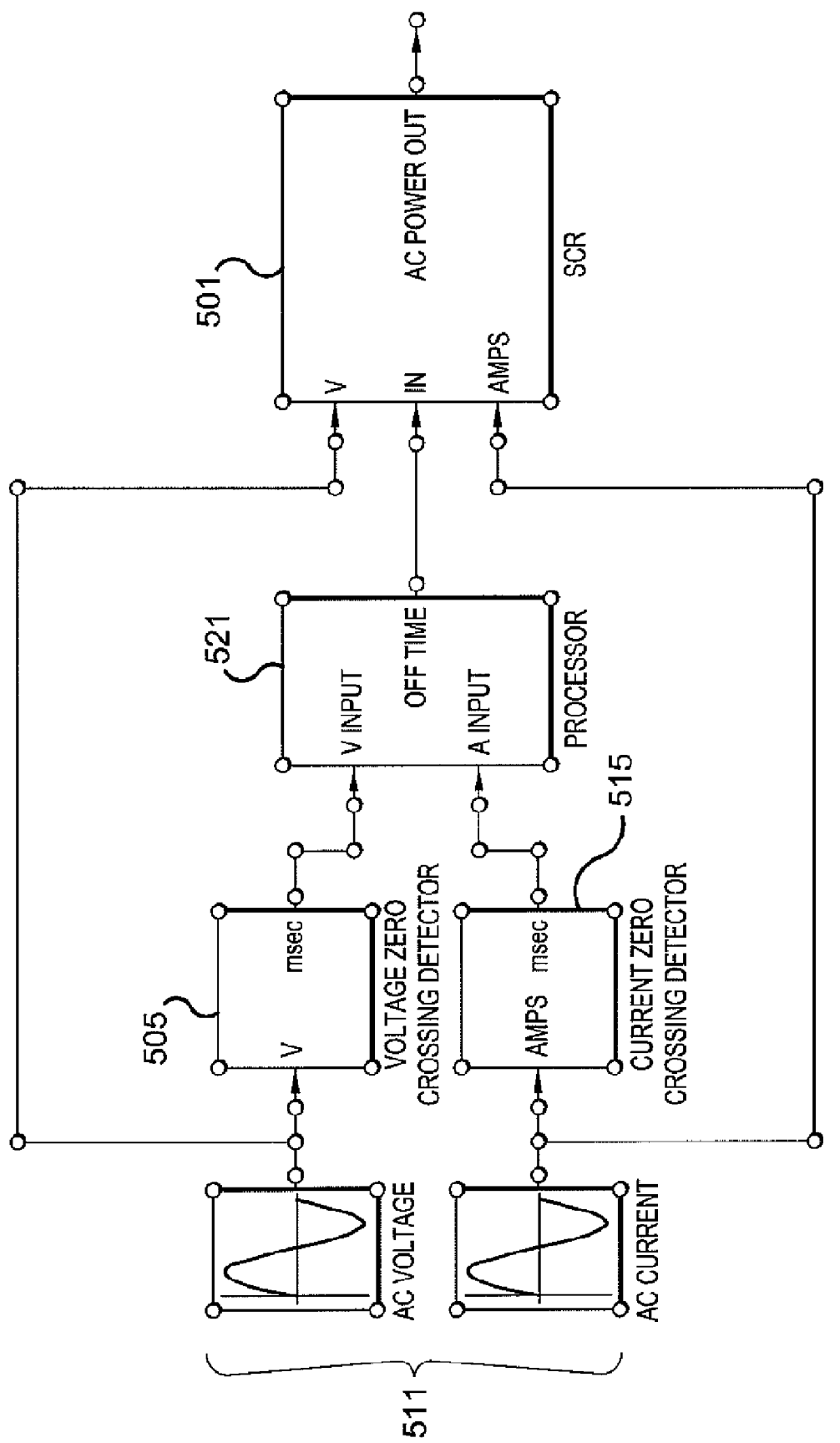
FIG. 5b is a block diagram depicting a controller device according to the present invention.

The first configurable timer may be used to set the variable Y discussed above and the second configurable timer may be used to set the variable Z. The cross detection unit may be used to detect zero crossings of voltage and current both during the Y and Z cycle times. The processor may be a programmable device that controls not only the firing of the thyristor, but the overall operation of the controller—coordinating the other components and managing the flow of information within the device. An embodiment of such a device is shown in FIG. 5b.

AC power 511 is provided to an SCR (Silicon Controlled Rectifier) bridge 501, which, in turn, is controlled by a processor 521 through appropriate firing circuits (not shown). The zero crossing point of both the voltage 505 and current 515 are detected and used with the algorithm stored in the processor 521 (which, in this embodiment, contains the processor 555, memory 580, calculation 560 and configurable timer 551 561 functions) to compute the on and off time of the SCR bridge 701 to control the power consumed by the motor.

Yet further alternative embodiments of the present invention may employ a general-purpose programmable controller programmed with an open-loop control method according to the present invention. Yet further embodiments of the present invention may employ a controller directly integrated into an electric motor, or a control program executed by a general purpose computer connected to the appropriate hardware components.

In some applications, the load may not experience sudden changes during motor operation. Appliances are typical examples of such applications. The uniqueness of appliance cycles lend themselves to further modifying an embodiment of the improved controller described above in a manner that provides for optimized performance in environments with lesser load variability.

Figure 6:
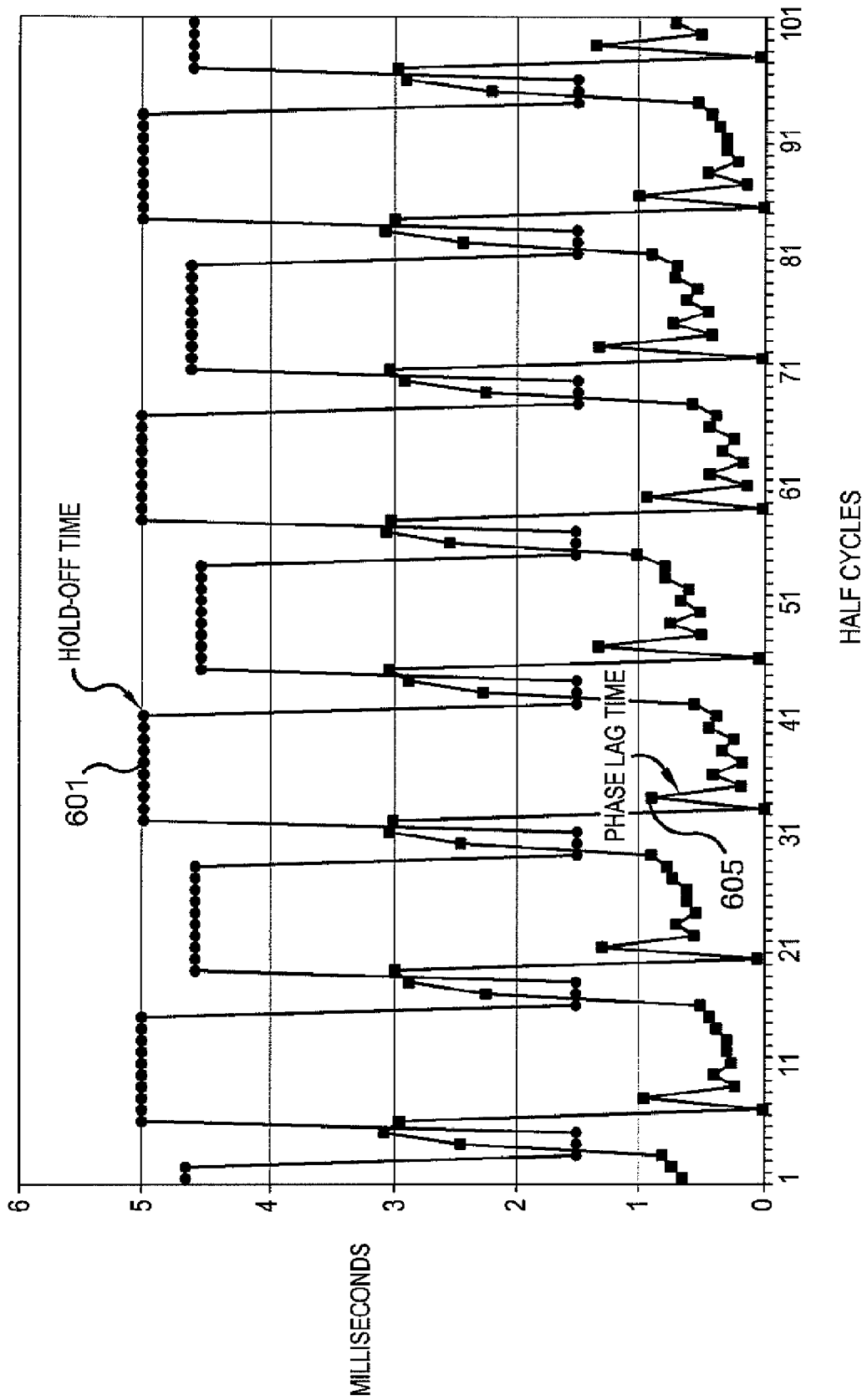
FIG. 6 illustrates a control cycle diagram for optimizing energy consumption of appliance motors.

For example, a refrigeration system in a home refrigerator or a soft drink vending machine has a temperature sensor that turns the motor on for a while and then off for a while. Similarly, an air-conditioning system cycles between on and off. Other appliances such as a dryer are simply turned on for a full cycle and shut down on a timer. While the motor in such systems is running, the load changes very gradually if at all. For applications in appliance control, the control method embodiment of FIG. 3 can be further refined. For a time X, during the starting of the motor, the voltage needs to be fully applied to bring the motor up to operational speed. Typically, the time X would be less than about 5 seconds. After the startup condition time X, the energy saving cycle can be engaged and may run continuously for the duration of the motor's on time. Because the load is typically does not change very much, if at all until, the motor is turned off again, the load measurement part of the cycle, Y, can be much longer. In one embodiment of a further refined control method, Y may be 30 to 60 cycles, and instead of reading the phase angle on only the last Y cycle, it may be read for the last 5 or 10 Y cycles and averaged for a more accurate and steady reading. Finally, because the load is going to change very slowly if at all, the energy saving part of the cycle Z may have a time of a minute or more. When the motor is shut down, the controller is then reset to the startup condition, X. Using this control sequence will result in the motor operating in the energy saving mode for almost all of its on time Preferred Embodiments Appliance motors are generally single-phase motors that run rather inefficiently and at loads that are less than their rated horsepower. Typically they operate at a power factor of about 0.7 at full load and 0.2 to 0.4 at no load. In an embodiment of the improved controller described herein, operating under reduced load, the power factor can be driven to a value better than that possible when operating at full load. Tests using an embodiment of the improved controller described herein on a single phase motor showed that the power factor could be raised to about 0.9 by reducing the average voltage supplied to the motor. FIG. 6 is a plot of phase lag in milliseconds and hold-off time in milliseconds from an embodiment of the improved controller on a lightly loaded single phase motor which is operating in the rapid response mode. With the phase lag at full voltage, the short 3 half-cycle period is about 3 milliseconds, which translates to a power factor of about 0.4. During the 10-cycle power saving mode, where the hold off time 601 is close to 5 milliseconds, the phase lag 605 has been reduced to less than one millisecond, which calculates to a power factor of over 0.9.

For appliances, the hold-off time can be much longer as there is no necessity to measure the load very frequently. The following descriptions illustrate how energy can be saved for various types of appliances. For example in a clothes dryer, the hold-off time can run for one minute or 7200 cycles, instead of 10 cycles as mentioned above.

Clothes Dryer Application

A dryer motor typically turns on and then runs until it is shut off, usually by a timer or moisture sensor. The motor is sized for a maximum load of wet laundry. If the machine is loaded with less laundry, which is most often the case, the motor's voltage can be reduced at the start. During the drying cycle, the laundry's moisture decreases. This reduces the weight of the laundry and, accordingly, the power needed. The controller will sense this reduction in motor load from its periodic load checks and reduce the voltage as the contents of the appliance are dried.

Figure 7:
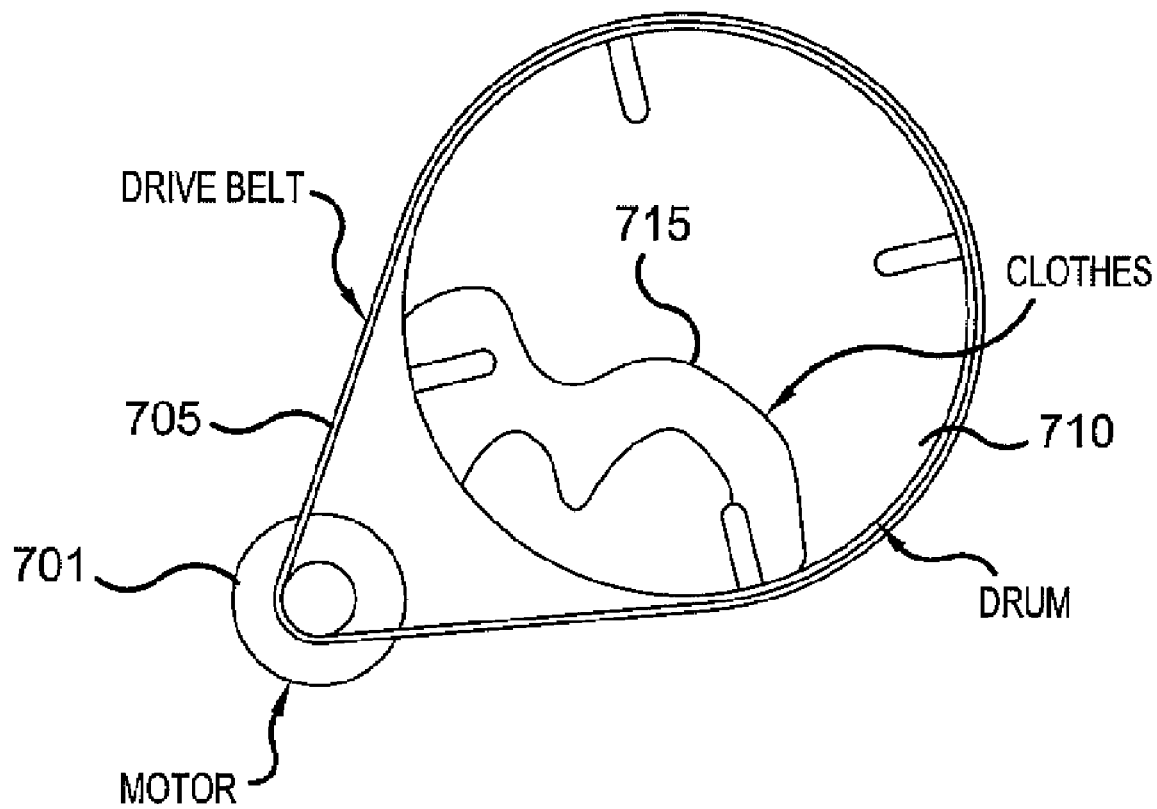
FIG. 7 shows a partial view of components in a typical clothing dryer appliance.

FIG. 7 is a typical clothing dryer construction diagram. A motor 701 rotates a large diameter drum 710 with a drive belt 705. Inside the drum 710 the clothes 715 are tumbled while drying. Drying is accomplished by circulating hot air into the drum. The air may be heated either by an electric heater or by a gas fired heater (not shown). The majority of the power consumed by the drum drive motor 701 is determined by the weight of the clothes 715. The motor size must be sufficient to turn the drum 710 when the dryer is fully loaded with wet clothes. As a solvent such as water evaporates from the clothing 715, the clothing weight is reduced, and consequently the torque required to turn the drum 710 is reduced.

Dryers are not always loaded with a maximum load and it is not unusual for the dryer to be loaded with only one item of clothing. In such cases, the load is significantly lower than motor was designed to handle, and this presents an opportunity for an embodiment of the improved controller of the present invention to reduce the motor's power consumption significantly.

Figure 8:
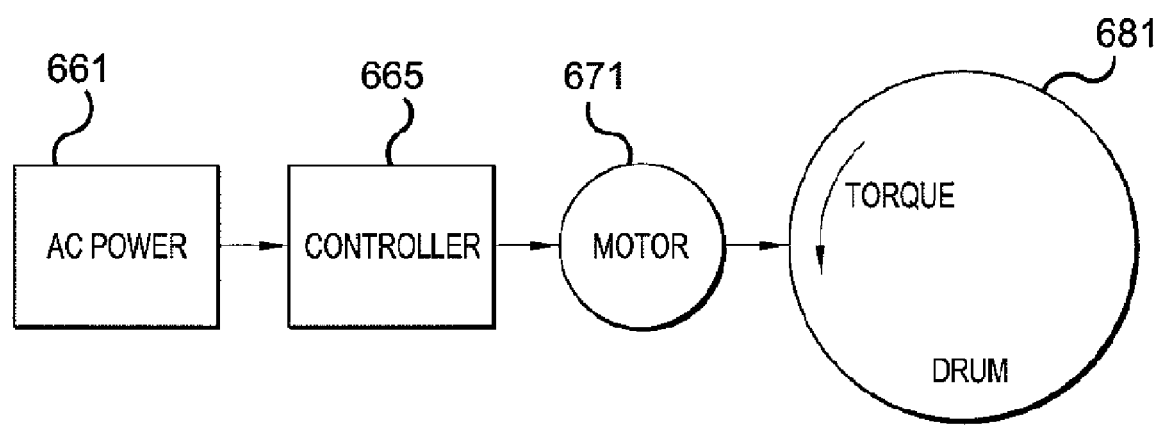
FIG. 8 illustrates an implementation of a block diagram of clothing dryer components.

FIG. 8 is a block diagram of an embodiment of a system used to control a dryer. The AC power 661 enters the controller 665, which in turn supplies reduced power to the motor 671 depending on how much power is needed to rotate the drum 681. Internal to the controller is the load sensing detector (not shown), the processor (not shown) and the motor voltage controller (not shown). Embodiments of these elements are as described, for example, in U.S. patent application Ser. No. 11/755,627. An embodiment of a controller as depicted in FIGS. 5a and 5b would be a suitable controller for this application.

Washing Machine Application

A washing machine motor performs a variety of tasks including agitating, spinning, and pumping water. The motor is typically sized to handle the maximum possible clothing load. Any smaller load can run at reduced voltage in a manner similar to the dryer as described above. In the spin cycle, the load is maximum at the start and reduces in weight as the water spins out, permitting the controller to reduce the voltage and energy consumption below what it would otherwise have been. During the pumping cycle, the motor is running at very little load to start and at no load once the water is pumped out. The time is controlled by a timer that has to be set at a longer time than it takes to pump out the water to provide a safety factor. An embodiment of the improved controller can adapt to all these activities automatically without any additional software or process control.

Figure 9:
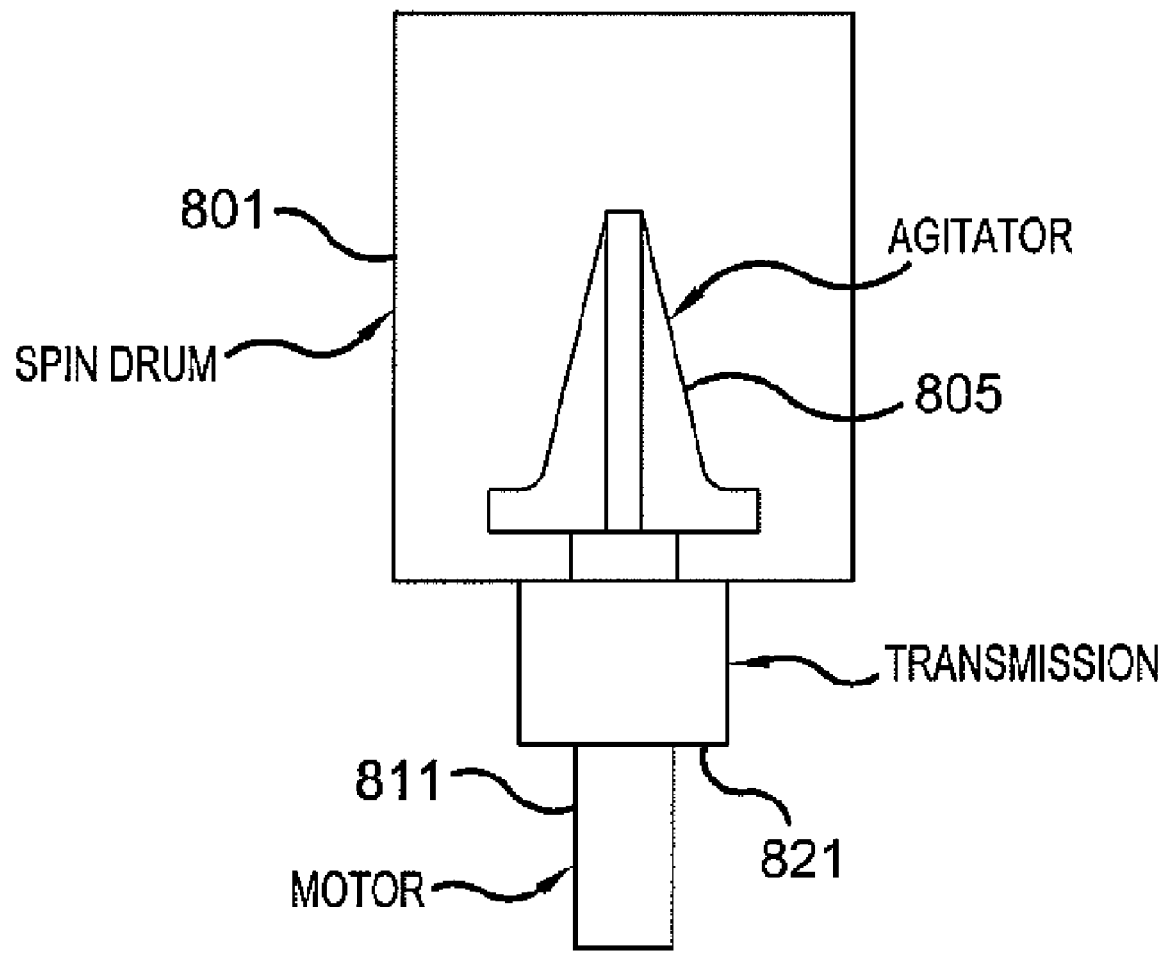
FIG. 9 shows typical components included in washing machine appliances.

FIG. 9 illustrates typical washing machine components. A motor 811 is connected to an agitator 805 and a spinning drum 801 through a transmission 821. Typically, the direction of the motor determines whether the agitator rotates or the drum rotates. Other designs select the appropriate drive depending on what part of the cycle is being used. The majority of the power consumed by the motor is determined by the weight of the clothes. The motor size must be sufficient to turn the agitator 805 with a full load of clothes as well as rotate the spin drum 801 with a full load of water-saturated clothing.

More often than not, the clothes load is less than a full load, and for most washers the water level is reduced in this case. In the reduced load case, the motor is running at less than full rated power and an embodiment of the improved controller described herein can be used to save additional power. Similarly, when spinning the load, the weight of the clothing is reduced as the water is extracted and the motor load goes down. The controller will sense this condition and reduce the power consumption.

Figure 10:
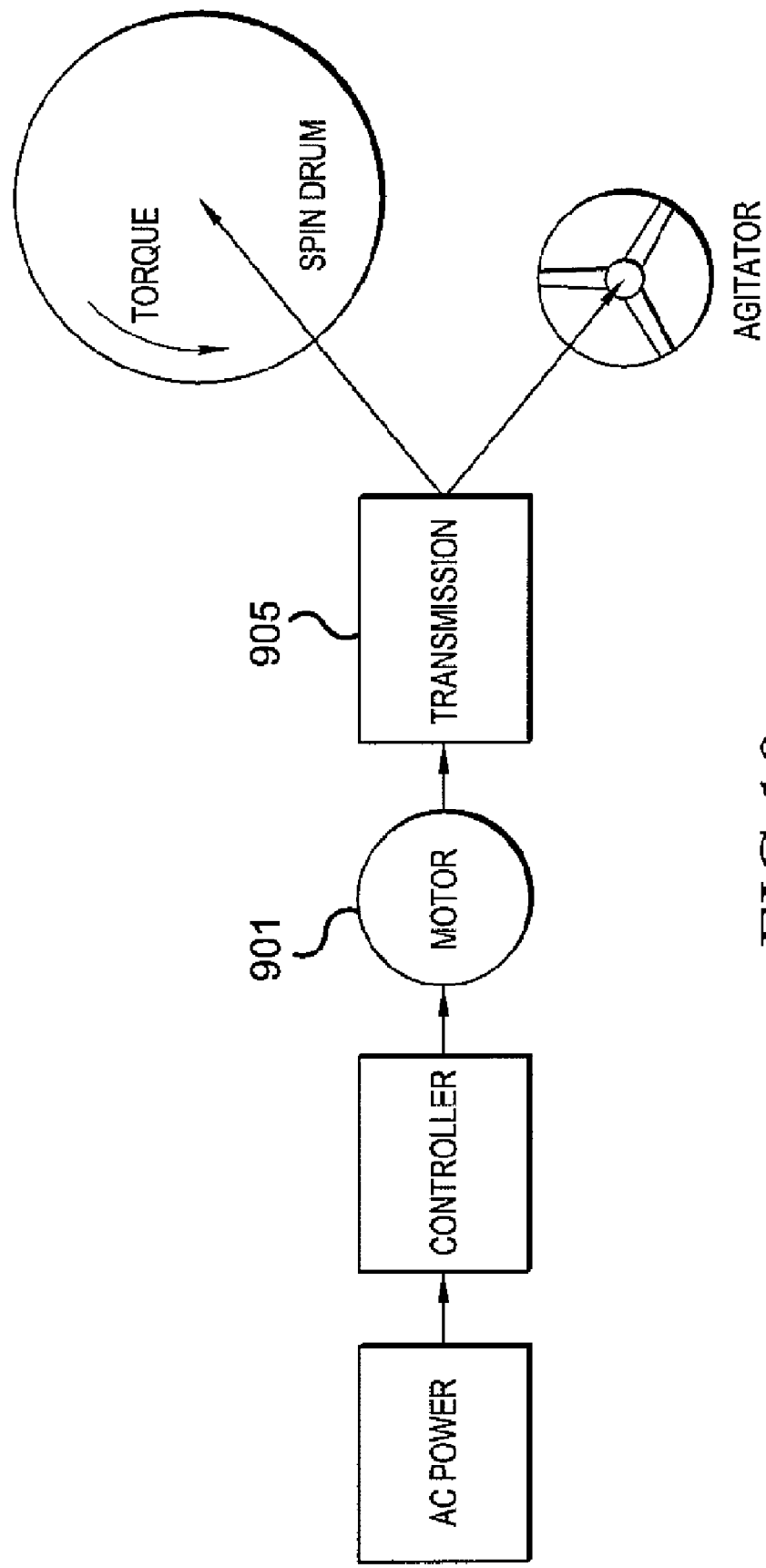
FIG. 10 illustrates a block diagram of a washing machine control system.

FIG. 10 is a block diagram of a washing machine control system using the energy saving controller. The main difference between a washing machine and a dryer embodiment is that in a washing machine, the motor 901 drives a transmission 905 instead of driving a drum directly. The operation of a controller in a washing-machine embodiment is the same as for that of a dryer. One possible embodiment for the controller is the same as that illustrated above in FIGS. 5a and 5b.

Refrigeration Applications (e.g. Refrigeration and Air Conditioning)

Figure 11:
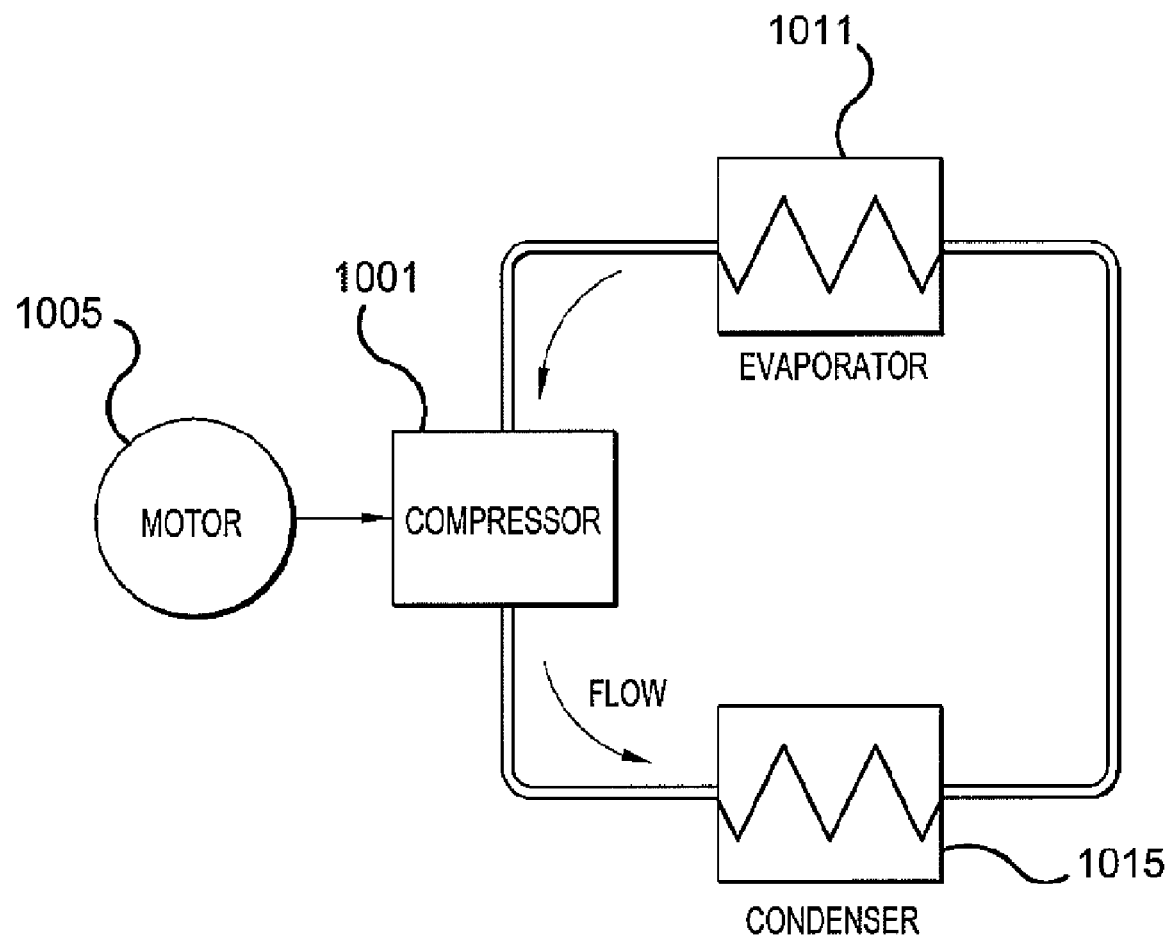
FIG. 11 illustrates a diagram of a refrigeration system.

FIG. 11 illustrates components of a typical refrigeration process used in both air conditioning systems and refrigeration systems such as refrigerators, water-coolers, drink vending machines, and freezers. In each case there is a motor driven compressor 1001 that consumes the majority of the power required. A refrigerator also typically includes a condenser 1015, and an evaporator 1011. The motor 1005 is usually a single-phase motor sized for the worst-case ambient temperature. In addition, there may be auxiliary motors (not shown) driving fans for circulating air across the evaporator and or condenser.

Tests on a refrigerator using an embodiment of the improved controller described herein showed the unit operating at a phase lag of about 2.3 milliseconds at room temperature. Using an embodiment of the improved controller of the present invention, the phase lag was reduced during the Z part of the cycle to less than 1 millisecond. Another element of energy saving inherent in the improved controller is the fact that a good portion of the losses in a motor come from the resistance of the coils. This loss is directly proportional to the square of the voltage across the coil. Therefore, if the voltage is reduced 10%, the coil loss is reduced almost 20%.

The motor driven compressor 1001 compresses a gas called the refrigerant to a high pressure. The refrigerant is then passed through a heat exchanger called the condenser 1015 and an expansion valve (not shown) to reduce its temperature. From there, the cold refrigerant is transferred to a heat exchanger called an evaporator 1011 to cool the surrounding air or space. Finally, the refrigerant returns to the compressor 1001 to be recompressed. The exact relationship of the state of the refrigerant and the subsequent pressures and temperatures are determined by thermodynamics and are known to those skilled in the relevant arts.

Figure 12:
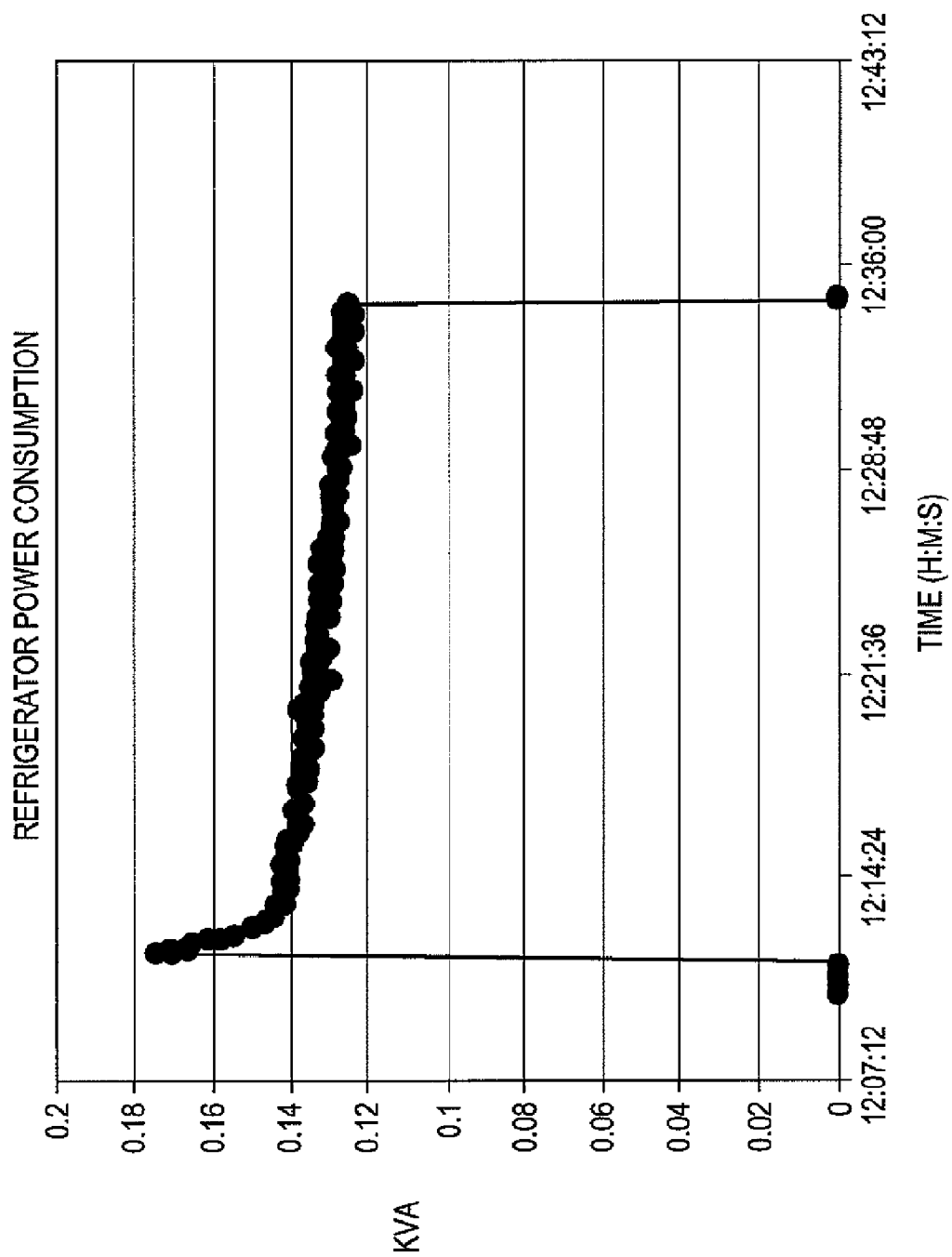
FIG. 12 illustrates power consumed over time by a typical refrigerator appliance.

The ambient temperature of the air surrounding the evaporator and the condenser determine the state of the refrigerant and the power needed to compress this refrigerant. In a typical refrigerator a thermostat turns on the compressor and runs it until the interior refrigerator space is cooled to the desired temperature. The compressor generally runs for about 15 to 20 minutes. The power to the compressor starts out at the initial required level and gradually decreases as the temperature of the compartment decreases. At the end of the cooling cycle, the compressor may be operating at 15 or 20% less power compared to the starting power. FIG. 12 shows a recording of power consumed by a standard home refrigerator.

The energy saving controller of the present invention can be applied to this case to reduce the power consumed. The control system block diagram will be similar to FIG. 6 except that the dryer drum 621 is replaced by the compressor 1001. In typical embodiments, the controller is connected between the AC power supply 601 and the appliance's motor. In one embodiment, no additional sensors, controls or other auxiliary devices are needed. The controller of such an embodiment senses the actual loads encountered by the various motors and controls them appropriately. Other embodiments may require additional sensors beyond the zero-crossing detectors of the controller.

Although the above descriptions are for specific appliances, it is understood that any application running at constant load or at a slowly changing load can be controlled by the improved controller operating along the general parameters described above. Other embodiments of the invention may be applied to furnaces, fans, fluid pumps, sump pumps, heat pumps, and garbage disposals, as well as any other motor-driven appliances. Furthermore, the methods can be applied to 3-phase motors with equal success.

The present invention may be embodied in other specific forms without departing from its spirit or essential characteristics. The described embodiments are to be considered in all respects only as illustrative and not restrictive. The scope of the invention is, therefore, indicated by the appended claim rather than by the foregoing description. All changes which come within the meaning and range of equivalency of the claims are to be embraced within their scope.

What is claimed is:

1. A method of power control for an electrical motor using open-loop principles comprising:
   a) providing a desired control line function that determines hold-off time based on a detected phase lag of a motor drive signal;
   b) driving the motor with a motor drive signal having a voltage zero crossing and a current zero crossing at full voltage for a given load for a first number of cycles;
   c) detecting the phase lag of the motor drive signal during driving;
   d) firing a thyristor with a firing time determined from the hold-off time of the desired control line function based on said detecting the phase lag; and
   e) controlling for phase lag for a second number of cycles, wherein said controlling comprises firing the thyristor according to the determined firing time after detecting a current zero crossing of the motor drive signal and further wherein there is no feedback of the motor drive signal required to perform controlling.

2. The method of claim 1, said driving comprising:
   determining a first number of cycles at which the motor will be driven at full voltage; and
   driving the motor at full voltage for the first number of cycles.

3. The method of claim 1, said detecting the phase lag comprising:
   detecting the voltage zero crossing of the motor drive signal;
   initiating a timer upon detection of the voltage zero crossing of the motor drive signal;
   detecting the current zero crossing of the motor drive signal; and
   stopping the timer upon detection of the current zero crossing of the motor drive signal, wherein the time measured between the voltage zero crossing and the current zero crossing comprises the phase lag.

4. The method of claim 1, said desired control line function comprising:
   a line slope, S, calculated from the expression S=Amax/(Bnl−Bfl), where Bnl is the phase lag of the motor at full voltage and no load, Bfl is the phase lag of the motor at full voltage and rated load, and Amax is the hold-off time for maximum phase reduction at no load; and
   an offset, Of, calculated from the expression Of=S*Blf, wherein
   the hold-off time, A, is calculated from the expression A=S*B−Of, where B is the detected phase lag.

5. The method of claim 1, wherein the given load comprises the present load seen by the motor.

6. The method of claim 1, said controlling further comprising:
   determining the second number of cycles.

7. The method of claim 1, further comprising:
   re-starting said method at running the motor after the completion of controlling.

8. The method of claim 1 wherein said cycles are half-cycles.

9. The method of claim 1, wherein said motor is a motor in an appliance.

10. The method of claim 9, wherein said appliance comprises: a clothes dryer, a washing machine, a furnace, a fan, a pump, a garbage disposal, or a refrigeration unit.

11. The method of claim 1, said detecting the phase lag comprising:
   detecting a first voltage zero crossing of the motor drive signal;
   detecting a first current zero crossing of the motor drive signal;
   computing the time measured between the voltage zero crossing and the current zero crossing as a first phase lag;
   detecting a second voltage zero crossing of the motor drive signal;
   detecting a second current zero crossing of the motor drive signal;
   computing the time measured between the voltage zero crossing and the current zero crossing as a second phase lag;
   calculating an overall phase lag from the computed phase lags, wherein the overall phase lag is determined to be the phase lag of the motor drive signal.

12. The method of claim 1, wherein the second number of cycles is at least five times greater than the first number of cycles.

13. The method of claim 1, wherein the motor drive signal is based on a 50 Hz or 60 Hz alternating current.

14. The method of claim 1, wherein the motor is operating at less than its maximum rated load.

15. The method of claim 1, wherein the load seen by the motor does not vary by more than 5% during said controlling.

16. The method of claim 1, further comprising:
   detecting a phase lag of the motor drive signal during said controlling;
   storing the detected phase lag of the motor drive signal during said controlling in a memory area every third number of cycles;
   comparing the stored phase lag to a current phase lag obtained from said detecting the phase lag of the motor drive signal during driving; and
   if said comparing shows that the stored phase lag is higher than the current phase lag, proceeding to driving, otherwise proceeding to controlling.

17. A computer-readable medium having embodied thereon a computer program for open-loop power control for an electrical motor that, when executed, comprises:
   a) providing a desired control line function that determines hold-off time based on a detected phase lag of a motor drive signal;
   b) driving the motor with a motor drive signal having a voltage zero crossing and a current zero crossing at full voltage for a given load for a first number of cycles;
   c) detecting the phase lag of the motor drive signal during driving;
   d) firing a thyristor with a firing time determined from the hold-off time of the desired control line function based on said detecting the phase lag; and
   e) controlling for phase lag for a second number of cycles, wherein said controlling comprises firing the thyristor according to the determined firing time after detecting a current zero crossing of the motor drive signal and further wherein there is no feedback of the motor drive signal required to perform controlling.

18. The medium of claim 17, said driving comprising:
   determining a first number of cycles at which the motor will be driven at full voltage; and
   driving the motor at full voltage for the first number of cycles.

19. The medium of claim 17, said detecting the phase lag comprising:
   detecting the voltage zero crossing of the motor drive signal;
   initiating a timer upon detection of the voltage zero crossing of the motor drive signal;
   detecting the current zero crossing of the motor drive signal; and
   stopping the timer upon detection of the current zero crossing of the motor drive signal, wherein the time measured between the voltage zero crossing and the current zero crossing comprises the phase lag.

20. The medium of claim 17, said desired control line function comprising:
   a line slope, S, calculated from the expression S=Amax/(Bnl−Bfl), where Bnl is the phase lag of the motor at full voltage and no load, Bfl is the phase lag of the motor at full voltage and rated load, and Amax is the hold-off time for maximum phase reduction at no load; and
   an offset, Of, calculated from the expression Of=S*Blf, wherein
   the hold-off time, A, is calculated from the expression A=S*B−Of, where B is the detected phase lag.

21. The medium of claim 17, wherein the given load comprises the present load seen by the motor.

22. The medium of claim 17, said controlling further comprising:
   determining the second number of cycles.

23. The medium of claim 17, further comprising:
   re-starting said method at running the motor after the completion of controlling.

24. The medium of claim 17 wherein said cycles are half-cycles.

25. The medium of claim 17, wherein said motor is a motor in an appliance.

26. The medium of claim 25, wherein said appliance comprises: a clothes dryer, a washing machine, a furnace, a fan, a pump, a garbage disposal, or a refrigeration unit.

27. The medium of claim 17, said detecting the phase lag comprising:
   detecting a first voltage zero crossing of the motor drive signal;

detecting a first current zero crossing of the motor drive signal;

computing the time measured between the voltage zero crossing and the current zero crossing as a first phase lag;

detecting a second voltage zero crossing of the motor drive signal;

detecting a second current zero crossing of the motor drive signal;

computing the time measured between the voltage zero crossing and the current zero crossing as a second phase lag;

calculating an overall phase lag from the computed phase lags, wherein the overall phase lag is determined to be the phase lag of the motor drive signal.

28. The medium of claim 17, wherein the second number of cycles is at least five times greater than the first number of cycles.

29. The medium of claim 17, wherein the motor drive signal is based on a 50 Hz or 60 Hz alternating current.

30. The medium of claim 17, wherein the motor is operating at less than its maximum rated load.

31. The medium of claim 17, wherein the load seen by the motor does not vary by more than 5% during said controlling.

32. The medium of claim 17, further comprising:
detecting a phase lag of the motor drive signal during said controlling;

storing the detected phase lag of the motor drive signal during said controlling in a memory area every third number of cycles;

comparing the stored phase lag to a current phase lag obtained from said detecting the phase lag of the motor drive signal during driving; and if said comparing shows that the stored phase lag is higher than the current phase lag, proceeding to driving, otherwise proceeding to controlling.

33. An apparatus for open-loop power control for an electrical motor comprising:
a voltage cross detector that detects the zero crossing of the voltage component of a power signal; and a current cross detector that detects the zero crossing of the current component of a power signal;

a memory unit that stores a first number of cycles, second number of cycles, a desired control function, a phase lag, and calculated thyristor firing time;

a thyristor; and a processor that controls the motor and fires the thyristor by:

providing a desired control line function that determines hold-off time based on a detected phase lag of a motor drive signal;

driving the motor with a motor drive signal having a voltage zero crossing and a current zero crossing at full voltage for a given load for a first number of cycles;

calculating, from the outputs of the voltage cross detector and the current cross detector, the phase lag of the motor drive signal during driving;

firing the thyristor with a firing time determined from the hold-off time of the desired control line function based on said detecting the phase lag; and controlling for phase lag for a second number of cycles, wherein said controlling comprises firing the thyristor according to the determined firing time after detecting a current zero crossing of the motor drive signal and further wherein there is no feedback of the motor drive signal required to perform controlling.

34. The apparatus of claim 33, wherein:
the processor further detects a phase lag of the motor drive signal during said controlling;

the memory unit stores the detected phase lag of the motor drive signal during said controlling in a memory area every third number of cycles;

the processor compares the stored phase lag to a current phase lag obtained from said detecting the phase lag of the motor drive signal during driving; and if said comparing shows that the stored phase lag is higher than the current phase lag, the processor proceeds to driving, otherwise the processor continues controlling.

35. The apparatus of claim 33, wherein:
the processor detects a first phase lag during said calculating by comparing the difference in the outputs of the current cross detector and the voltage cross detector;

the memory unit stores the first phase lag in a memory area;

the processor detects a second phase lag during said calculating by comparing the difference in the outputs of the current cross detector and the voltage cross detector;

the memory unit stores the second phase lag in a memory area;

the processor computes, based on the first and second phase lags, an overall phase lag of the motor drive signal;

the memory units stores the overall phase lag in a memory area; and the processor uses the overall phase lag as the phase lag of the motor drive signal.

* * * * *